Figure 1:
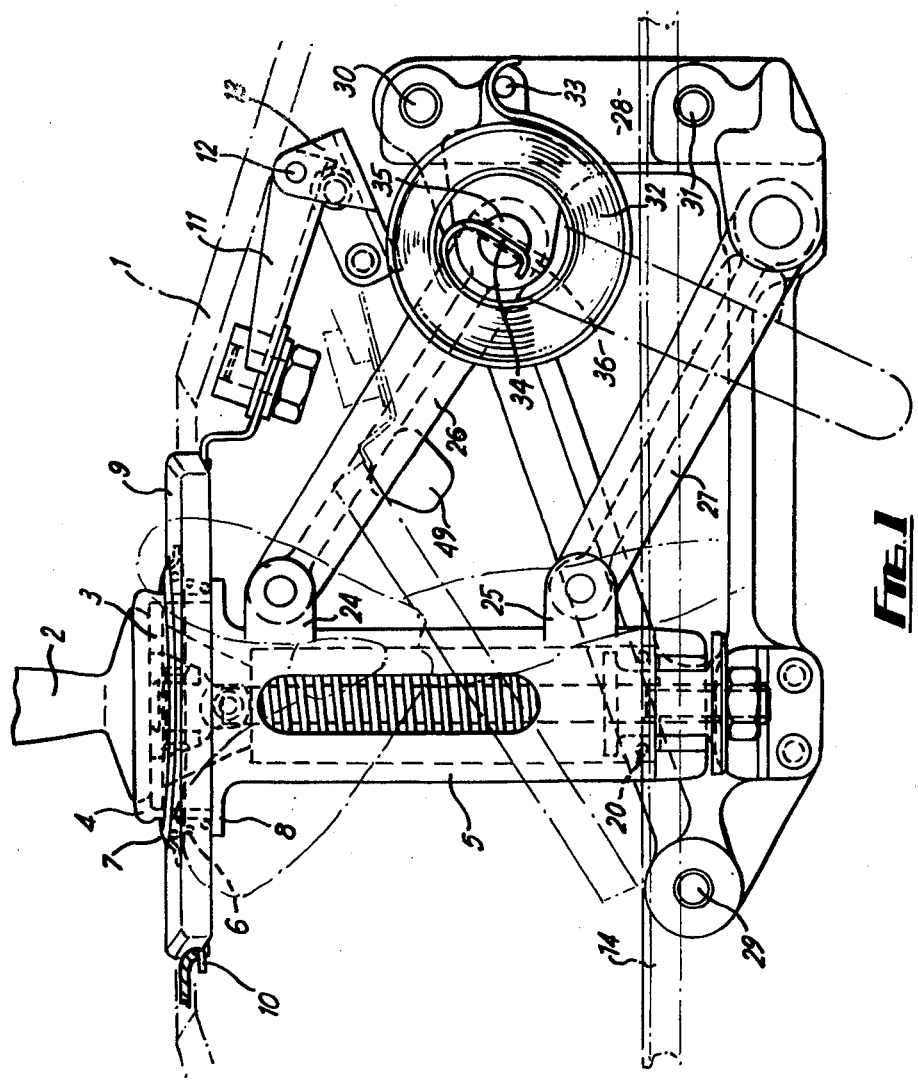

United States Patent [19]

Ridgway

[11] 4,061,303

[45] Dec. 6, 1977

[54] APPARATUS FOR RETRACTING A RETRACTABLE PROTRUSION

[75] Inventor: Bryan George Ridgway, Sandbach, England

[73] Assignee: Rolls-Royce Motors Limited, Crewe, England

[21] Appl. No.: 736,500

[22] Filed: Oct. 28, 1976

[30] Foreign Application Priority Data

Nov. 8, 1975 United Kingdom ............... 46293/75

[51] Int. Cl.² ............................................. B60R 27/00
[52] U.S. Cl. .................................. 248/204; 248/475 B; 280/762
[58] Field of Search ............ 248/475 B, 475 A, 475 R, 248/204, 281; 428/31; 280/762

[56] References Cited

U.S. PATENT DOCUMENTS

| | | | |
|---|---|---|---|
| 2,724,996 | 11/1955 | O'Shei | 248/475 B |
| 2,914,988 | 12/1959 | O'Shei | 248/475 B |
| 3,588,016 | 6/1971 | Reinhard et al. | 248/204 |
| 3,813,113 | 5/1974 | Burnham | 248/475 B |

*Primary Examiner*—Marion Parsons, Jr.
*Attorney, Agent, or Firm*—Cushman, Darby & Cushman

[57] ABSTRACT

A vehicle mascot is mounted on a support to project through an aperture in the vehicle radiator shell. The support is pivotally mounted on the shell and a spiral spring acts to bias the support into a retracted position in which the mascot is almost wholly retracted into the radiator shell. The support and mascot are maintained in a non-retracted position by a detent which acts to prevent movement of the support under the action of the spiral spring. The mascot is connected to an actuator which, on deflection of the mascot more than, say, 25% from its normal upright position, against the biasing action of a compression spring constrained to act between the support and the actuator, releases the detent to allow the spiral spring to retract the support and mascot.

15 Claims, 5 Drawing Figures

APPARATUS FOR RETRACTING A RETRACTABLE PROTRUSION

The present invention relates to apparatus for retracting a retractable protrusion. It is particularly, but not exclusively, applicable to automobile mascots.

One such automobile mascot is described in British patent specification No. 1,279,047. Although the arrangement operates satisfactorily, the mascot is liable to retract too easily and it can be difficult to re-erect the mascot after it has been retracted, particularly if it is given a realistically high resistance to retraction.

According to the present invention there is provided apparatus for retracting a retractable protrusion comprising a base member adapted to be connected to the body from which the protrusion extends, a support for the protrusion pivotally connected to the base member, first spring means urging the support in one angular direction relative to the base member, detent means operative to restrain movement of the support in said one angular direction, an actuating member adapted to be connected to the protrusion and mounted for movement relative to the support, and second spring means constrained between the support and actuating member, the arrangement being such that movement of the actuating member relative to the support against the action of the second spring means causes release of the detent means enabling movement of the support in said one angular direction.

A preferred embodiment of the invention may comprise any one or more of the following preferred features.

a. The support for the protrusion is pivotally connected through two arms to the base member, b. The two arms of (a) are forged aluminium.

c. The first spring means is a spiral spring.

d. The first spring means is concentrically mounted on one of the arms of (a).

e. The support for the protrusion comprises an annular support member superposed on a substantially cylindrical body surrounding the actuating member.

f. The actuating member is provided at its end adapted for connection with a pivotal arrangement enabling universal movement.

g. The end of the actuating member remote from the end adapted for connection to the protrusion comprises a bobbin.

h. The detent means is a spring loaded pawl having one arm normally disposed between the flanges of the bobbin of (g) and another arm disposed in a notch in the base member.

i. The second spring means is a helical compression apring.

j. One flange of the bobbin of (g) is made rotatable relative to the other and is formed with a slot which can be aligned with the pawl of (h) to allow movement of the actuating member of (f) relative to the support for the protrusion, such movement allowing the protrusion to deflect without causing retraction. When the recess is not aligned with the pawl retraction will occur after sufficient deflection.

k. A solenoid operable actuator is provided for rotating the flange of (j) between slot aligned and non-aligned positions.

l. The body from which the protrusion extends is a vehicle and the protrusion itself is a vehicle mascot.

Figure 2:
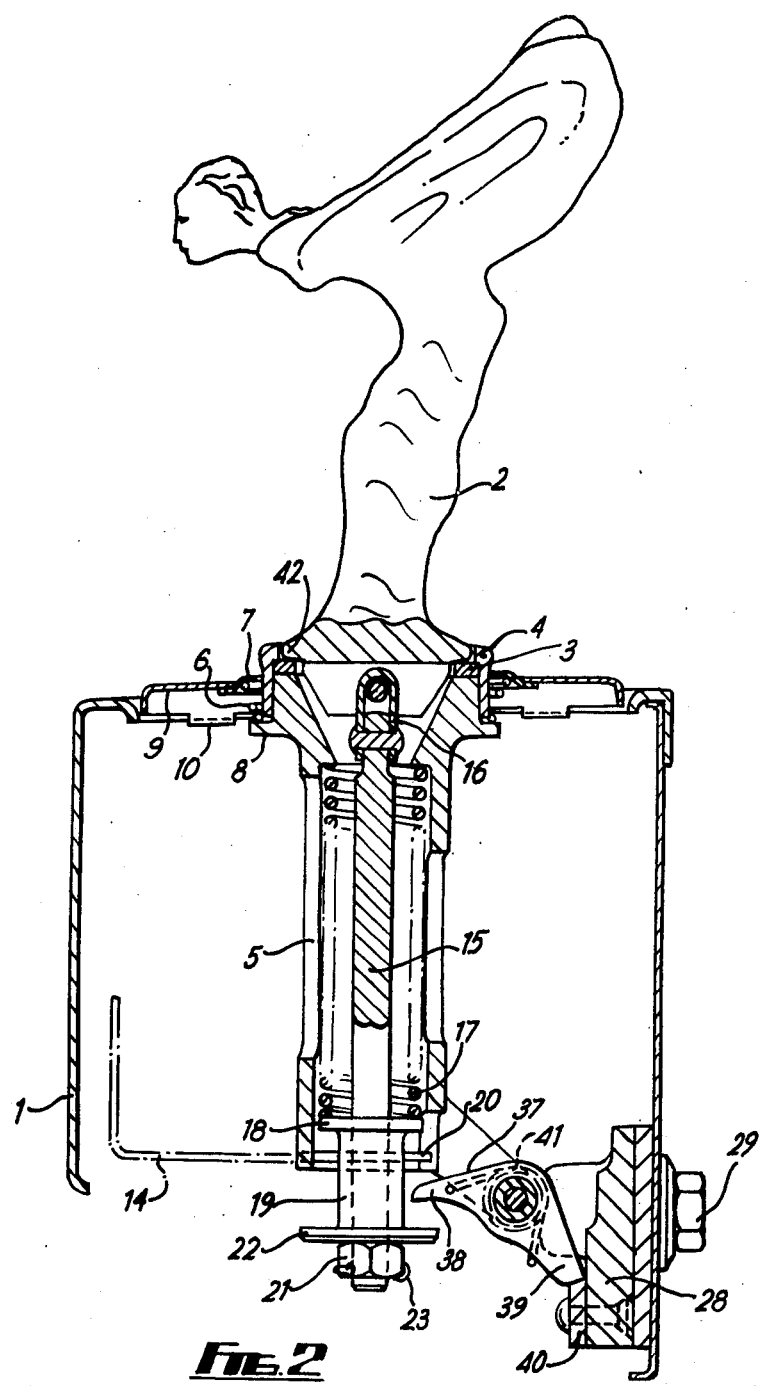
Figure 3:
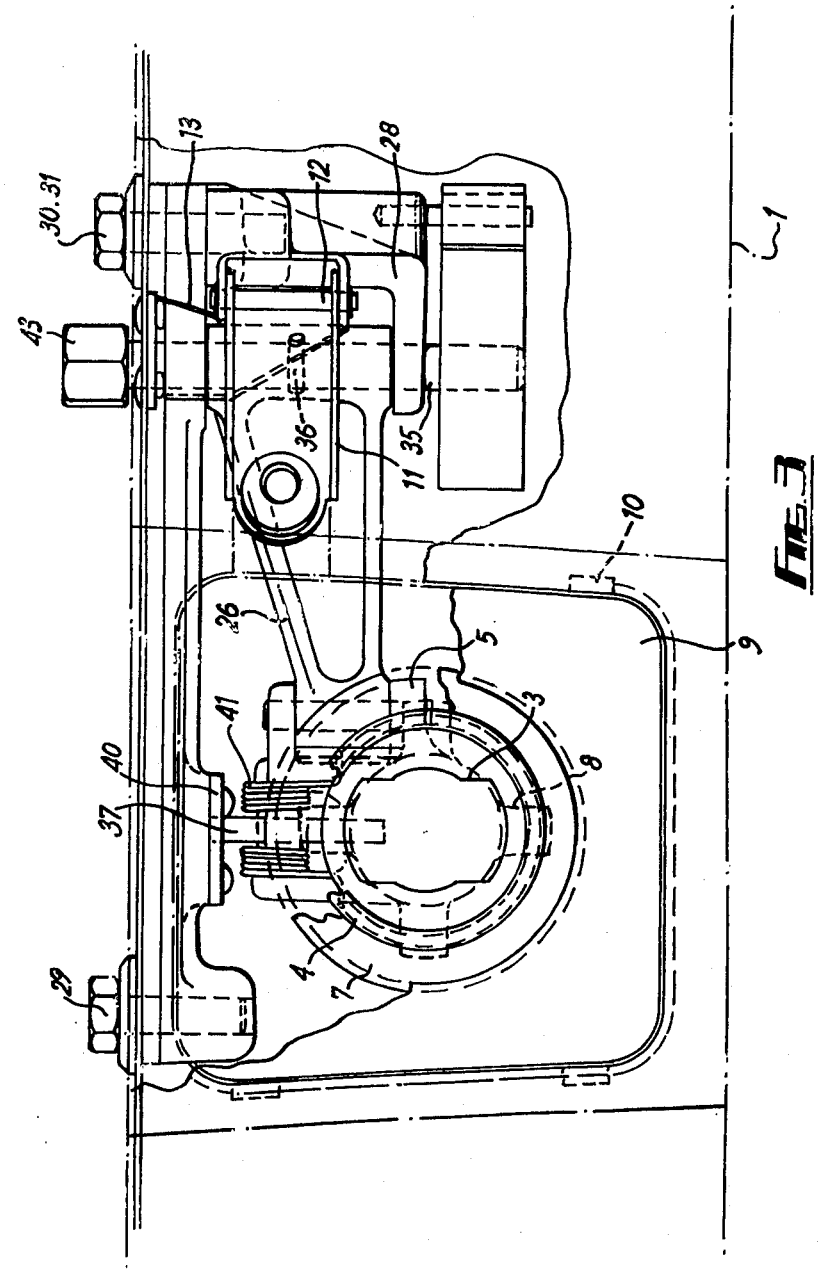
Figure 4:
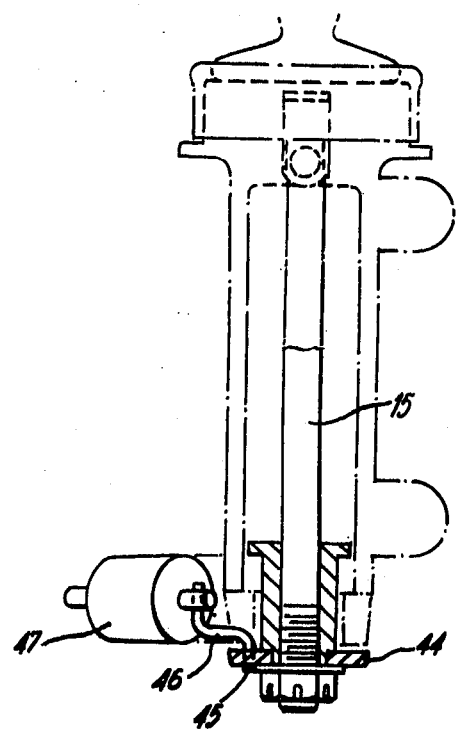
Figure 5:
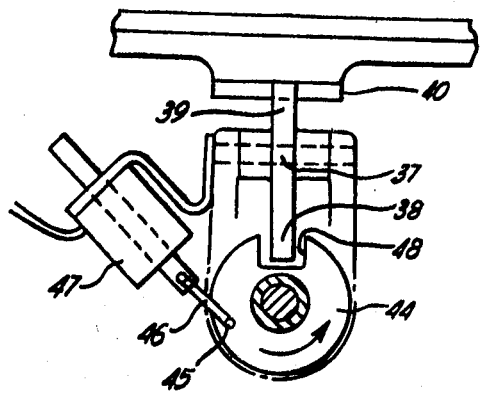

In order that the invention may be more clearly understood, one embodiment will now be described, by way of example, with reference to the accompanying drawings in which:

FIG. 1 shows a front elevational view of a mascot retraction apparatus with the mascot in the erect position, FIG. 2 shows a side elevational view of the apparatus of FIG. 1, FIG. 3 shows a plan view of the apparatus of FIG. 1, FIG. 4 shows a front elevational view of a modification of the arrangement of FIGS. 1 and 2, and FIG. 5 shows a plan view of the modification of FIG. 3.

FIGS. 1, 2 and 3 shows a housing 1, such as the upper part of the radiator shell of a motor car. Surmounting the plateau at the apex of the shell is retractable protrusion 2, such as a vehicle mascot shown in its normally upright position extending out of an aperture through the housing 1. The base of the protrusion 2 has a flat annular portion and a wedge shaped protuberance, the annular portion being seated on and the wedge portion located by the locating washer 3, thus supporting and orientating the protrusion 2 in the correct alignment relative to the housing 1. The locating washer 3 is retained within the finishing ring 4 in turn is retained on a protrusion support member 5 such as a cylindrical body. Surrounding the finishing ring 4 are the plinth spring 6 and the spring retainer 7, movement of the spring retainer is limited upwards by its abutment with an enlarged portion of the finishing ring 4, limited downwards by the abutment of itself and the plinth spring with lugs 8 on the member or body 5.

The spring retainer 7 pushed by plinth spring 6 supports the plinth 9 causing four tabs 10 thereon to abut a flange on the housing 1, thus limiting its upwards movement and placing it in the correct position. The plinth 9 is further supported by a hinge leaf 11, hinge pin 12 and the hinge bracket 13 which is riveted to a closing plate at the rear of the radiator shell. The bolted joint between the plinth 9 and the hinge leaf 11 allows the plinth 9 to be adjusted to the correct position. The hinge serves to guide the path of the plinth as it falls under its own weight as the mascot retracts, downwards movement of the plinth 9 being limited by its abutment with a supporting angle bracket 14 which is used to support vanes within the radiator shell. The location of the hinge pin 12 is chosen to guide the plinth 9 so that the hole therein follows the complex path followed by the mascot's legs on retraction.

Referring particularly to FIG. 2, down the support member or cylindrical body 5 there extends an actuating member 15 an actuating member which is pivotally connected at its upper end, to a U shaped bracket 16 which is again pivotally connected to the protrusion 2 in a slot within the wedge shaped protuberance of the protrusion 2, the two pivotal axes are arranged at right angles to each other thus allowing a degree of universal motion between the mascot and the shaft. A helical compression spring 17 is restrained between a shoulder on the body 5 and an upper flange 18 of a bobbin 19, also forming part of the actuating member 15, the bobbin and thereby the spring being retained on the body by retaining pins 20 until the protrusion 2 and shaft assembly are fitted. A nut 21 is screwed onto a threaded portion at the lower end of the actuating member 15 against the lower flange 22 of the bobbin 19 until the flange 22 is a specified distance from the lower face of the support member or body 5, as determined by a setting gauge, the nut 21 is then fixed in position by the use of a split pin 23 through a cross-drilling of the shaft 15. The spring 17 thus normally urges the protrusion or mascot 2 downwardly, downwards movement being restricted by the abutment of the mascot base on the locating washer 3 and its abutment on the support member or body 5.

The support member or body 5 is formed with two extending lugs 24 and 25 to which two forged aluminium arms 26 and 27 are pivotally connected. These arms 26 and 27 are pivotally connected at their other ends to a base member 28 in the form of a cast support bracket which is in turn bolted to a closing plate located at the rear of the radiator shell by means of bolts 29, 30 and 31. The arm 26 is constantly urged in an anticlockwise direction by means of a spiral spring 32 concentrically mounted with the pivotal axis of the end of the arm 26 on the base member or bracket 28. The outer end of the spring abuts a pin 33 on the bracket and the inner end of the spring is disposed in slot 34 formed in one end of a bolt 35 on which the arm 26 is mounted and prevented from rotating relative to bolt 35 by the pin 36.

Anticlockwise motion is restrained by detent means in the form of an angled pawl 37 which is pivotally mounted on the body support member or 5. This pawl has an arm 38 which extends between the flanges 18 and 22 of the bobbin 19 and an arm 39 which sits on a seat 40 which is riveted to the face of the base member or bracket 28. A spring 41 constantly urges the pawl onto the face of the base member or bracket 28.

The operation of the apparatus is as follows.

The mascot will pivot about a centre of a radius 42 formed around the mascot base edge diagonally opposite to the point at which a force is applied. Usually these forces will be from any horizontal direction, but a large enough force from any direction whose line of action does not pass through the plane of the mascot's pivot centres within the circle formed by the mascot's pivot centres will cause a deflection to occur. The radius 42 pivots on the location washer 3 against the finishing ring 4 thus raising the shaft 15 against the spring force of the spring 17. The corner formed between the washer 3 and ring 4 restrains any tendency which the mascot would have for erratic pivotal movement about other points. If the applied force is sufficient to cause the deflection of the mascot to exceed say 25° from the vertical the shaft 15 will rise an amount sufficient to deflect the pawl arm 39, through abutment of the flange 22 and the pawl arm 38, off the seat 40. When this happens the spiral spring 32 rotates the arm 26 anticlockwise (see FIG. 1), and through arm 26 the body 5 and the arm 27 in an anticlockwise direction. As a result the mascot 2, together with the body 5 and its attached parts, are drawn downwards in a path determined by the centres and the arm lengths of the arms 26 and 27. This downwards movement is arrested by the abutment of a buffer 49 (of resilient material for example natural rubber), attached to the underside of the arm 26, on that part of the arm 27 which surrounds its pivot on the bracket 28. The retraction of the support member or body 5 takes away the support of the plinth 9 by the retainer 7 and the spring 6, thus allowing the plinth 9 to fall under its own weight guided by the hinge 11, 12 and 13 until arrested by abutment with angle bracket 14. The removal of the plinth in this manner leaves a hole of sufficient size in the top of the radiator shell to allow the mascot to pass through. The lowermost position of the mascot and plinth are shown in chain-dotted lines in FIG. 1. The tip of the mascot just protrudes from the upper part of the radiator shell.

The mascot will remain in this position until reerected. To re-erect the mascot, the bonnet of the automobile is lifted to afford access to the rear of the mechanism. A spanner (advantageously an offset ring spanner) is placed over the nut 43, formed on the end of the bolt 35 projecting through the closing plate, and the nut turned against the force of the spiral spring 32, turning with it the arm 26 by the pin 36. As the mascot and mechanism rises the finishing ring 4 eventually abuts the lower side of the plinth 9 thus lifting it against its own weight being guided into its correct final position by the hinge assembly 11, 12 and 13, as the mascot nears its final erect position the ring 4 comes through the hole in the plinth 9 thus allowing the spring retainer 7 and plinth spring 6 to support the plinth 9 abutting the tabs 10 against the flange. The arm 39 of the spring loaded pawl is first deflected by the lower edge of the seat 40 and then as it passes the upper edge of the seat it is forced back onto the face of the bracket 28 by the spring 41. The support member or 5 is then supported again by the pawl 37 seating on the seat 40 holding the mascot in its erect position, the spanner is then removed and the bonnet closed. The mascot is now able to stay erect until such time as it again suffers the application of a sufficient load to initiate the retraction process.

Referring to FIGS. 4 and 5, an arrangement is shown for de-energising the mechanism described above. In this arrangement, the lower flange 22 of the bobbin 19 is replaced by a rotatable plate 44. This plate 44 is apertured at 45 to recieve one end of a substantially S-shaped link 46 the other end of which is inserted itno a solenoid operable actuator 47. The actuator 47 is connected to the support member or body 5. The pawl 37 extends from the support member or body 5 and, in the operative position of the mechanism, this pawl 37 is aligned with a slot 43 formed in the periphery of the disc 44. If the mascot 2 is now subjected to a horizontal deflecting force, upward movement of the shaft of the actuating member 15 allows the disc 44 to lift without touching pawl 37 which cannot therefore be withdrawn off the step 40, thus allowing the mascot to deflect without causing retraction. To render the retract mechanism operable, the solenoid is energised and the actuator 47 rotates the plate 44 to bring it into a position in which the slot 48 and pawl 37 are disaligned. If the mascot 2 is now subjected to a horizontal deflecting force, upward movement of the rod 15 will deflect pawl arm 39, through the abutment of the disc 44 and pawl arm 38, off step 40 to allow downward pivotal movement of the relative parts under the action of the spiral spring 32.

The solenoid circuitry will advantageously be connected in with the ignition of gear change circuitry of the car so that when the ignition is turned on the solenoid is energised to mis-align the slot and the pawl 27 so that the retraction mechanism is placed in an operative condition. Alternatively, the arrangement may be such that the retraction mechanism is placed in an inoperative condition with the solenoid energised in which case the circuitry is arranged so that the solenoid is energised with the ignition off.

In place of the recessed plate 44, a plate having a projection may be provided in which case the retraction mechanism is operative only when the projection and pawl 37 are aligned.

The solenoid actuator 47 may be replaced by a hydraulic or pneumatic cylinder or a switched electric motor actuator to suit the particular installation and available operating signal.

The above described arrangement enables a normally projecting mascot on an automobile to be automatically retracted when subjected to an external horizontal force from any direction. The two spring arrangement enables the force sufficient to cause retraction to be adjusted independently of the retraction force itself provided by the spiral spring. Present proposed regulations allow a maximum horizontal force of 22$lb$ but the independent nature of the springs means that a different, usually lesser vertical force than that can be used to carry out the actual retraction thus minimising the torque required for re-erection. The force causing retraction will normally be adjusted by appropriate changes in the compression spring wire diameter and in the number of turns. The retraction force will normally be varied by varying the width of the strip used in the spiral spring. The arrangement also provides for ease of re-erection simply by gaining access to the engine compartment and turning the upper arm pivot with the aid of a spanner against the force of the spiral spring until the pawl clicks into position in its notch. It is thought that a torque on the spanner of 4 lbs ft. will suffice. Furthermore, the solenoid operated actuator provides a convenient and reliable arrangement for rendering the mechanism inoperative, whilst still allowing deflection of the mascot when the car is parked, without any additional action on the part of the driver being required.

What is claimed is:

1. An apparatus for retracting a retractable protrusion through an aperture in a housing at least partially into the housing from which it extends, said apparatus comprising:
   a base member fixedly connected to said housing;
   a support member for said protrusion, said support member being pivotally connected to said base member;
   first spring means urging said support member in one angular direction relative to said base member;
   detent means operative to restrain movement of said support member in said one angular direction;
   an actuating member operatively connected to said protrusion and mounted for movement relative to said support member; and
   second spring means constrained between said support member and said actuating member, whereby movement of said actuating member relative to said support member against action of said second spring means causes release of said detent means to enable movement of said support member in said one angular direction.

2. Apparatus as claimed in claim 1 including two arms pivotally connecting said support member for the protrusion to said base member.

3. Apparatus as claimed in claim 2, in which said two arms are of forged aluminium.

4. Apparatus as claimed in claim 1, in which said first spring means is a spring.

5. Apparatus as claimed in claim 1, in which said support member for said protrusion comprises an annular portion superposed on a substantially cylindrical body surrounding said actuating member.

6. Apparatus as claimed in claim 1 including means universally pivotally connecting said actuating member to said protrusion.

7. Apparatus as claimed in claim 1, in which said actuating member has an end remote from its operative connection to said protrusion which comprises a bobbin having spaced flanges.

8. Apparatus as claimed in claim 7, including a notch in said base member in which said detent means is a spring loaded pawl having one arm normally disposed between the spaced flanges of said bobbin and another arm disposed in said notch in the base member.

9. Apparatus as claimed in claim 1, in which said second spring means is a helical compression spring.

10. Apparatus as claimed in claim 2, in which said two arms have a pivot to said support member for said protrusion and to said base member and said first spring means is a spiral spring which is concentrically mounted on one of said pivots of said two arms.

11. Apparatus as claimed in claim 8, in which one flange of said bobbin is made rotatable relative to the other and is formed with a slot which can be aligned with said pawl to allow movement of said actuating member relative to said support member for the protrusion without displacing said detent means.

12. Apparatus as claimed in claim 11, in which a solenoid operable actutator is provided for rotating said one rotatable flange between a position in which said slot and said pawl are aligned and a position in which said slot and said pawl are unaligned.

13. An apparatus as claimed in claim 1, including a plinth extending in one position across a gap defined between an edge of the aperture of said housing and an edge of said support member, said plinth being movable from said one position to a second position to open the aperture for the retraction of the protusion.

14. An apparatus as claimed in claim 13, in which said plinth is pivotally connected to said base member and a spring is constrained to act between said plinth and said support member to maintain said plinth in said one position.

15. An apparatus as claimed in claim 14, in which said housing is a radiator shell for a vehicle and said protrusion is a vehicle mascot.

* * * * *